2,795,887

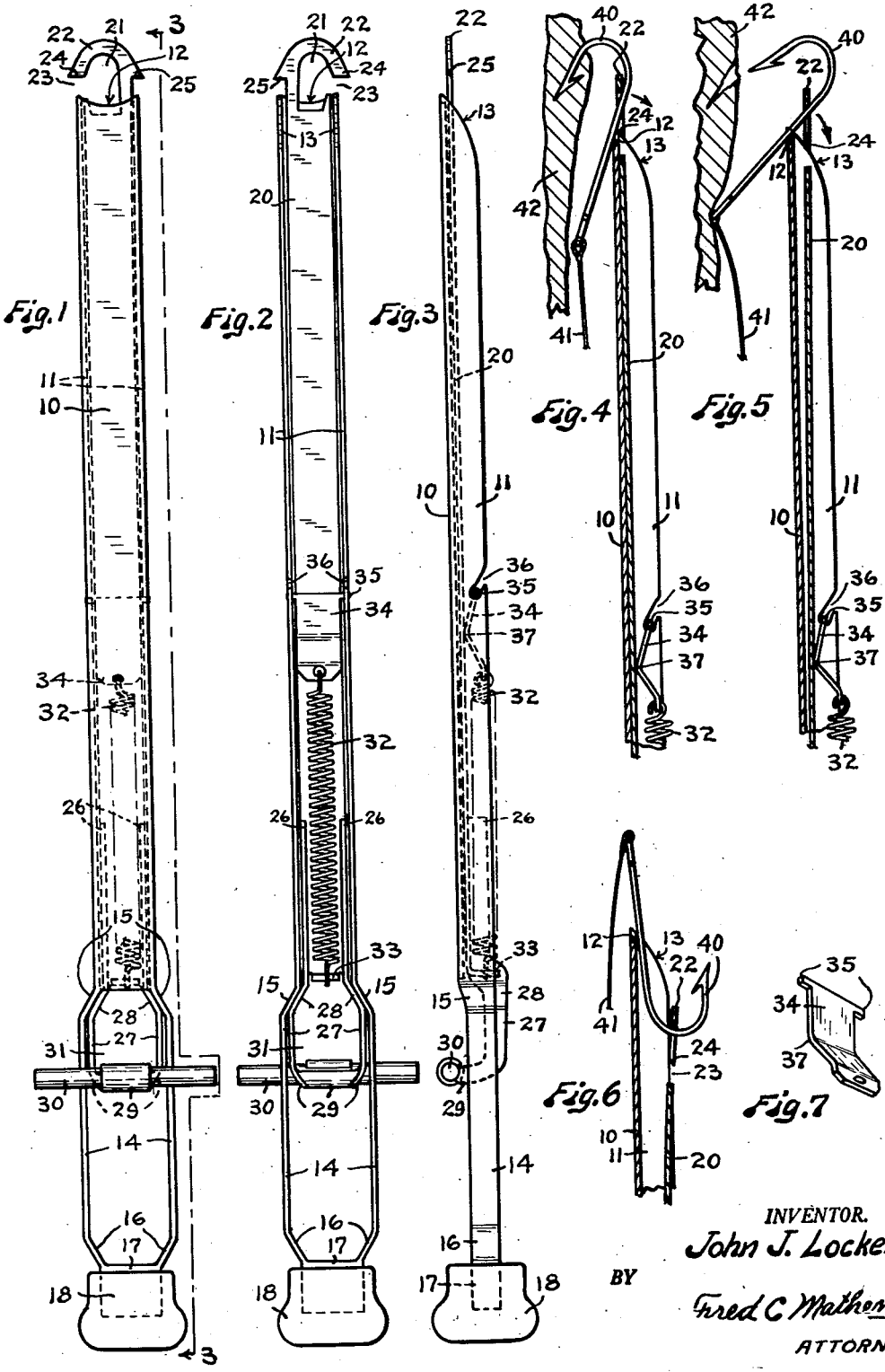

FISH HOOK EXTRACTOR

John J. Lockert, Seattle, Wash.

Application December 29, 1955, Serial No. 556,257

6 Claims. (Cl. 43—53.5)

My invention relates to a fish hook extractor and an object of my invention is to provide a simple and efficient device for quickly and easily disengaging a fish hook from the tissue and removing the same from the body cavities, such as the mouth, throat, gullet or stomach of a fish.

Another object is to provide a fish hook extractor which can be inserted through the mouth and as far as necessary down the throat of a fish and manipulated in such a manner as to disengage a fish hook and turn it end for end before said fish hook is withdrawn from the fish thus positioning the fish hook so that its point is rearwardly directed and cannot be re-engaged in the flesh or tissue of the fish while it is being withdrawn.

Other objects are to provide a fish hook extractor which is not liable to break or otherwise damage the fish hook, which minimizes the danger of injury to the hands of the user, which detaches the hook from the flesh of the fish with a minimum damage to the fish, and one which is simple and inexpensive to manufacture and convenient to use.

Other objects of my invention will be apparent from the following description taken in connection with the accompanying drawings.

In the drawings:

Figure 1 is a view in elevation showing one side of my fish hook extractor.

Fig. 2 is an elevation showing the opposite side of the same.

Fig. 3 is an edge view looking in the direction of broken line 3—3 of Fig. 1.

Fig. 4 is a fragmentary view in longitudinal section showing my extractor applied to a fish hook which is embedded in the flesh of a fish.

Fig. 5 is a view similar to Fig. 4 illustrating the operation of my extractor in disengaging the fish hook and turning it end for end so that the point of the fish hook will be rearwardly directed as said fish hook is withdrawn from the fish.

Fig. 6 is a view similar to Figs. 4 and 5 showing a typical position of the fish hook after it has been turned end for end and is still engaged with the extractor.

Fig. 7 is a detached perspective view of a pressure plate used in connection with a spring.

Like reference numerals refer to like parts throughout the several views.

My fish hook extractor comprises a main frame member of channel shaped cross section formed of a web or back portion 10 and two side flanges 11. At the forward or outer extremity this main frame web 10 has an end 12 which is concavely recesed transversely considered. Also at this outer end portion of the main frame the side flanges 11 are inclined or beveled like sled runners to provide rounded bearing surfaces or cams 13. Toward the other or handle end of the main frame the web portion 10 is cut away for a substantial distance and the side flanges are spread apart forming two parallel spaced apart guide bars 14 which are connected with the main frame by inclined stop portions 15. At their outer ends the guide bars 14 have other convergent stop portions 16 which are connected with each other by an integral terminal portion 17. A knob 18 of suitable shape to fit within the cupped palm of the hand is fixedly secured to the terminal frame part 17. The main frame formed of parts 10 to 17 inclusive is easily and inexpensively made from a single piece of sheet metal by conventional stamping and bending processes.

A straight flat slide member 20, which also can be formed from a single piece of flat sheet metal, is slidably disposed within the channel shaped main frame. The forward or outer end of this slide member 20 has a recess 21 formed therein in such a manner as to provide a hook member 22 having an entrance opening or throat 23 at one side thereof. The tip 24 of the hook 22 extends sidewise far enough so that it functions as a cam engaging element at one side of the hook and another cam engaging element 25 is rigid with and protrudes sidewise from the opopsite side of the hook. The edges of both of the cam engaging elements 24 and 25 toward the inclined cams 13 are beveled and said cam engaging elements are adapted to ride up on these inclined cams 13 when the slide member 20 is longitudinally moved toward the handle end of the extractor.

The handle end portion of the slide member 20 has two short side flanges 26 formed thereon. These side flanges 26 extend beyond the flat part 20 of the slide member and are spread apart providing two short side bars 27 which are positioned between the longer side bars 14 of the main frame. Inclined stop portions 28 connect the short side bars 27 with the side flanges 26 and an integral portion 29 at the end of the side bars 27 connects said side bars 27 with a cross bar 30. The cross bar 30 extends across the side bars 14 on the same side of the main frame as the web 10 and holds the slide 20 and side parts 27 in assembled relation.

These extractors may be made in various different sizes. In extractors of large size and short side bars 27 are preferably spread apart far enough to provide an opening 31 large enough to receive a finger of the user who grasps the device with preferably three fingers engaged with the bar 30 and the knob 18 in the cupped palm of the hand. Movement of the slide member 20 relative to the main frame is produced by exerting a squeeze on the parts 30 and 18. This movement is limited in one direction by engagement of the inclined parts 28 and 15 and in the opposite direction by engagement of the parts 29 and 16.

A tension spring 32 has one end connected with a part 33 of the slide member 20 and the other end connected with one end of an offset pressure bar 34 which is disposed between the side flanges 11 of the main frame. The other end of the pressure bar 34 has pivot lugs 35 protruding sidewise therefrom and engaged within inclined notches 36 in the side flanges 11. The pressure bar 34 has a part 37 which extends toward and rests against the slide 20 and yieldingly urges the slide 20 toward the web part 10 of the main frame but allows said slide 20 to move outwardly as the parts 24 and 25 of the hook 22 are moved upwardly along the cams 13. The lugs 35 can easily be inserted into or removed from the slots 36 thereby facilitating quick and easy assembly and disassembly of the device.

In using this device to extract a fish hook 40 from the body of a fish the user engages the hook member 22 of the extractor over the fish line 41 to which the fish hook 40 is attached and while holding the line 41 taut inserts the tip or outer end of the extractor into the mouth of the fish and moves the extractor down along the line until the hook part 22 of the extractor passes over the shank of the fish hook 40, see Fig. 4. In this position the shank of the hook 40 will usually be between the back 10 of the extractor and the surface of the fish tissue 42 with which the hook is engaged. While the extractor is being moved along the line 41 into the fish the slide 20 preferably will be held retracted far enough to close the throat opening 23 of the hook 22 and thus prevent disengagement of the extractor from the line 41. When the extractor and the fish hook are about in the relative positions shown in Fig. 4 the extractor will begin to bind the shank of the fish hook and a pressure can be exerted on the fish hook tending to push the same back out of the fish tissue. When the parts are in about the position shown in Fig. 4 a squeeze can be exerted by the user on the cross bar 30 and knob 18 so as to move the cam engaging parts 24 and 25 of the hook member 22 up along the cam surfaces 13. This moves the slide 20 away from the web or back part 10 of the main frame into a position somewhat as shown in Fig. 5 and the relative longitudinal and transverse movement between the slide 20 and main frame exerts an end for end turning force on the fish hook. This turning force is exerted through a lever arm of progressively increasing length with the fish hook pivoting about the end 12 of the web member 10 as the hook parts 24 and 25 are moved along the cams 13. The turning force thus exerted presses the eye end portion of the fish hook 40 against the adjacent fish tissue 42, detaches the embedded point of the fish hook from the fish tissue without objectionably tearing the fish tissue and turns the fish hook end for end into a position approximately as shown in Fig. 6. In this position the extractor and the fish hook can be withdrawn without danger of the fish hook re-engaging with the fish tissue.

The tension of the spring 32 yieldingly urges the slide 20 into the position shown in Figs. 1, 2 and 3 with the hook portion 22 thereof overhanging the end of the main frame 10, 11. Also this spring 32 yieldingly urges the part 37 of the bar 34 against the slide 20 thus yieldingly holding said slide against the web member 10 except when the hook parts 24 and 25 are moved upwardly along the cams 13, at which time this yielding pressure permits movement of the outer end portion of the slide member 20 away from the web 10 of the main frame into positions as shown in Figs. 5 and 6.

The foregoing description and accompanying drawings clearly disclose a preferred embodiment of this invention but it will be understood that this disclosure is merely illustrative and that changes may be made within the scope of the following claims.

I claim:

1. A fish hook extractor comprising a main frame having a straight flat part; a straight flat slide member movably disposed parallel with and close to the straight flat part of said main frame and having a fish hook receiving hook shaped tip portion movable with said slide member between an overhanging position and an overlapping position relative to an end portion of said main frame; means transversely moving the tip portion of said slide member away from said main frame when said slide member is longitudinally moved retractively; means limiting relative longitudinal movement of said slide member and said main frame; spring means urging said slide member into an outwardly projected position; and manually operable means providing retractive movement of said slide member, whereby when a fish hook extends across the outer end of said main frame and through the hook shaped tip of said slide member retractive movement of said slide member will exert a gradually increasing turning force on said fish hook.

2. The apparatus as claimed in claim 1 in which resilient means is provided yieldingly urging the flat slide member into face to face contact with the flat part of the main frame.

3. A fish hook extractor comprising a main frame having two spaced apart sides tapered at their outer ends providing two inclined cam surfaces; a slide member movable longitudinally and transversely between said sides and having a fish hook engaging hook shaped tip portion capable of receiving a fish hook and provided with cam engaging parts positioned in over riding relation to said cam surfaces transversely moving said slide member away from said frame when said said slide member is longitudinally moved retractively, whereby when a fish hook extends across the end of the frame and through said hook member retractive movement of said slide member will exert a gradually increasing end for end turning force on the fish hook; means limiting relative longitudinal movement of said slide and said main frame; spring means urging said slide into an outwardly projected position relative to said main frame; and manually operable means providing retractive movement of said slide member.

4. A fish hook extractor comprising a main frame of channel shaped cross section having a straight flat web part and having two sides tapered at their outer ends providing two inclined cam surfaces; a straight flat slide member disposed within said channel shaped main frame movable longitudinally thereof and movable toward and away from the web part of said main frame, said slide member having a fish hook engaging hook shaped tip at its outer end capable of receiving a fish hook and provided with cam engaging parts aligned with said cam members; spring means connected between said slide member and said main frame yieldingly urging the slide member toward the web part of the main frame and toward a position in which the hook shaped tip portion of the slide member extends beyond the adjacent end of the main frame; means limiting relative longitudinal movement of said slide member and said main frame; and hand grip means providing retractive movement of said slide member, whereby when a fish hook extends across the end of said main frame and through the hook shaped outer end portion of said slide member retractive movement of said slide member will move the outer end portion of said slide member away from said web part as said cam engaging parts are moved along said cam surfaces and will exert a gradually increasing turning force on said fish hook.

5. A fish hook extractor comprising a main frame of channel shaped cross section having a straight flat web part and having two side flanges tapered at one end providing two inclined cam surfaces, said side flanges having oppositely positioned inclined notches spaced a substantial distance from the inclined cam surfaces; a straight flat slide member disposed within said main frame movable longitudinally thereof and movable toward and away from the web portion of the main frame, said slide member having a fish hook engaging hook shaped tip capable of receiving a fish hook and provided with cam engaging parts aligned with said cam surfaces; a pressure bar having pivot lugs on one end portion releasably engaged within said inclined notches anchoring said pressure bar to said main frame, said pressure bar having an offset part engaging said slide member and capable of pressing said slide member toward the web part of said main frame; a tension spring having one end connected with said slide member remote from the hook shaped tip thereof and the other end connected with the end portion of said pressure bar remote from the pivot lugs on said bar, said spring yieldingly urging the slide member toward the cam carrying end of the main frame and yieldingly holding the offset part of said pressure bar against said slide member; and manually operable means providing retractive movement of the slide member against the force of said spring.

6. A fish hook extractor comprising a main frame of channel shaped cross section having spaced apart parallel side flanges; parallel side bars rigid with said side flanges at one end of said main frame and spaced apart a greater distance than the side flanges; a knob connected with the terminal portions of said parallel side bars; a slide member movably disposed within said channel shaped main frame; other side bars shorter than said first named side bars rigid with an end portion of said slide member and guided for movement between said first named side bars; a grip bar secured to the terminal parts of said other side bars and extending across said first named side bars; a spring connected between said slide member and said main frame yieldingly urging said slide member toward the end of said main frame remote from said knob; and fish hook engaging and extracting means carried by the end portions of said slide member and said main frame remote from said knob and grip bar.

References Cited in the file of this patent

UNITED STATES PATENTS

| | | |
|---|---|---|
| 2,578,289 | Danielson | Dec. 11, 1951 |
| 2,688,816 | Bondeson | Sept. 14, 1954 |